E. D. BANGS.
Condensing-Vessel.

No. 203,873. Patented May 21, 1878.

WITNESSES:

INVENTOR:
E. D. Bangs
BY
ATTORNEYS

UNITED STATES PATENT OFFICE.

EDWARD D. BANGS, OF GALESBURG, ILLINOIS, ASSIGNOR TO AMELIA FRANCES BANGS, OF SAME PLACE.

IMPROVEMENT IN CONDENSING-VESSELS.

Specification forming part of Letters Patent No. 203,873, dated May 21, 1878; application filed May 2, 1878.

*To all whom it may concern:*

Figure 1:
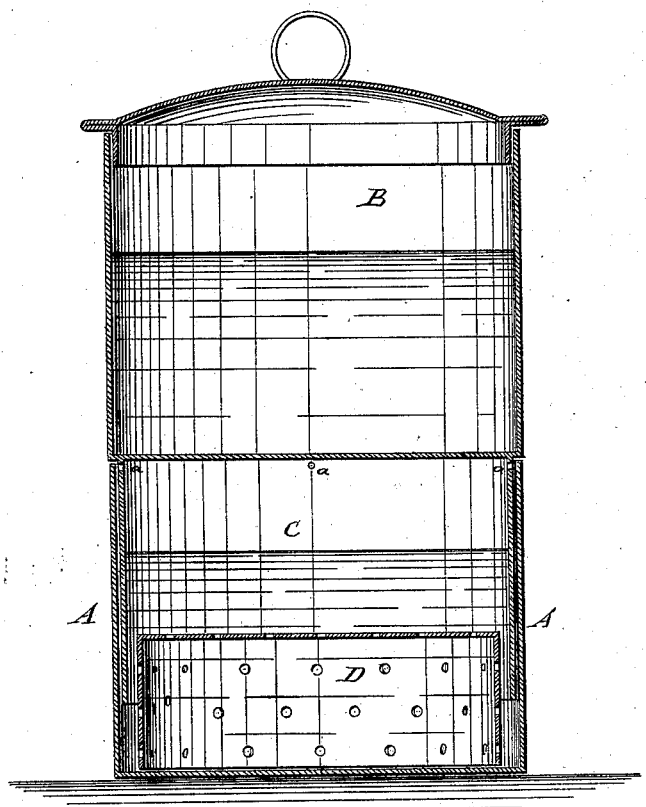
Figure 2:
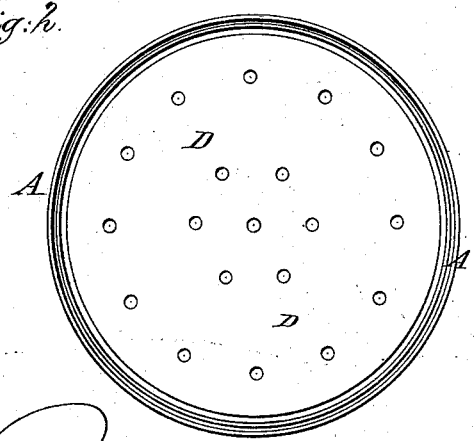

Be it known that I, EDWARD D. BANGS, of Galesburg, in the county of Knox and State of Illinois, have invented a new and Improved Condensing-Vessel, of which the following is a specification:

In the accompanying drawing, Figure 1 represents a vertical central section of my improved condensing-vessel, and Fig. 2 a top view of the lower part with upper section removed.

Similar letters of reference indicate corresponding parts.

This invention relates to an improved condensing vessel or apparatus for extracting the entire strength from tea or coffee in superior manner, and preserving also the aroma and flavor of the same, and for steeping, boiling, or cooking any substances whatever.

The invention consists of a lower boiling-vessel and of an upper vessel, which is telescoped by a bottom extension into the lower vessel, the upper section serving for the purpose of condensing the steam in the lower vessel by means of cold water or other cooling substance. The extension of the upper vessel has small exit-holes near the bottom of the vessel, for the escape of air when being telescoped into the lower vessel. In the lower vessel is placed a perforated supporter when fruits are to be cooked.

A represents the lower section of my improved condensing-vessel for tea, coffee, or other substances; and B, the upper section, which is fitted into the lower part by means of a cylindrical bottom section, C, that telescopes into the lower section to some distance from the bottom of the same.

The section A may be provided with a circumferential trough or gutter on the inside or outside, which trough is designed to hold water, so that a downward-extending flange of the upper vessel, when immersed or dipped in the liquid of the trough, forms a hydraulic seal for the vessels. This produces the hermetical connection of the upper and lower vessels, and prevents the escaping of any aroma or flavor from the substance boiled in the lower vessel.

The upper vessel is to be filled with cold water, or any other cooling substance, which, when becoming heated, may be changed for water of less temperature. When the substance in the lower vessel is boiling, the steam or vapor is condensed at the bottom of the upper vessel, and thereby returned again until the steeping or cooking is finished. The strength of the tea, coffee, or other substance is thereby extracted in a superior degree, and a simple and reliable condensing apparatus obtained.

The cylindrical extension C is arranged with small vent-holes, $a$, near the bottom of the upper vessel, to let out the air when the upper vessel is lowered into the bottom vessel. The extension of the upper vessel forms a tightly-fitting joint with the bottom vessel, so as to dispense with the gutter and flange, except when the condenser is used for such purpose in which an absolute sealing is required.

When the condenser is used for cooking fruit, or similar articles that are liable to stick to the bottom and get burned, a perforated cylindrical supporter, D, is placed on the bottom of the lower vessel, which prevents the contact of the fruit with the bottom of the vessel, and precludes thereby any danger of burning the same in cooking.

Having thus described my invention, I claim as new and desire to secure by Letters Patent—

1. A condensing vessel or apparatus consisting of a lower vessel and of an upper vessel, having bottom extension with air-vent holes, the extension telescoping into the bottom vessel, substantially as and for the purpose set forth.

2. A condensing vessel or apparatus consisting of a lower vessel and interior perforated supporter, and of an upper vessel, with bottom extension and air-vent holes, telescoping into the lower vessel, substantially as specified.

EDWARD DWIGHT BANGS.

Witnesses:
  J. J. TUNNICLIFF,
  CHAS. E. DE LAND.